United States Patent [19]
Henson et al.

[11] Patent Number: 5,465,343
[45] Date of Patent: Nov. 7, 1995

[54] SHARED MEMORY ARRAY FOR DATA BLOCK AND CONTROL PROGRAM STORAGE IN DISK DRIVE

[75] Inventors: James A. Henson, Morgan Hill; James P. McGrath, Mountain View; Bruce R. Peterson, San Jose; Tim R. Glassburn, Milpitas; Michael L. Raab, Fremont; James H. Do, Milpitas, all of Calif.

[73] Assignee: Quantum Corporation, Milpitas, Calif.

[21] Appl. No.: 56,428

[22] Filed: Apr. 30, 1993

[51] Int. Cl.$^6$ .................................................. G06F 13/12
[52] U.S. Cl. ................... 395/439; 364/DIG. 1; 364/DIG. 2; 364/236.2; 364/239; 364/239.4; 364/243; 364/243.4; 364/243.41; 364/243.42; 364/245.5; 364/245.6; 364/246; 364/248.1; 395/827; 395/894; 395/496
[58] Field of Search .................. 364/DIG. 1 MS File, 364/DIG. 2 MS File; 395/200, 250, 400, 425, 500, 800

[56] References Cited

U.S. PATENT DOCUMENTS

| | | | |
|---|---|---|---|
| 4,396,959 | 8/1983 | Harrison et al. | 360/77.08 |
| 4,669,004 | 5/1987 | Moon et al. | 360/53 |
| 4,730,321 | 3/1988 | Machado | 371/38 |
| 4,746,998 | 5/1988 | Robinson et al. | 360/72.1 |
| 4,835,686 | 5/1989 | Furuya et al. | 395/425 |
| 5,005,089 | 4/1991 | Thanos et al. | 360/77.08 |
| 5,072,420 | 12/1991 | Conley et al. | 395/425 |
| 5,084,791 | 1/1992 | Thanos et al. | 360/77.04 |

OTHER PUBLICATIONS

Excerpt, CL–SH350 Integrated Synchronous SCSI Disk Controller, Prelim. Data Sheet, Cirrus Logic, Inc, Milpitas, Calif. Nov. 1988, pp. 1–3, 21–23, 59–66.
OTI–018, Oak Technology, Inc., Hard Disk Controller Chip Engineering Specification Jun. 1992, Version 4.00.

*Primary Examiner*—Robert B. Harrell
*Attorney, Agent, or Firm*—David B. Harrison

[57] ABSTRACT

An improved disk drive architecture includes a microcontroller interface circuit connected between a drive microcontroller and a buffer controller. The microcontroller interface circuit includes address mapping registers for mapping at least one predetermined portion of directly addressable memory of the microcontroller to address locations of the drive's cache buffer. The buffer controller circuit includes an access arbitration circuit for arbitrating requests for access to the cache buffer by the drive's data sequencer, the drive's host interface controller and the drive's microcontroller. A microcontroller wait state generator responds to the access arbitration circuit by generating and applying a wait state sequence to the microcontroller until a request it makes for access to the cache buffer can be executed.

18 Claims, 12 Drawing Sheets

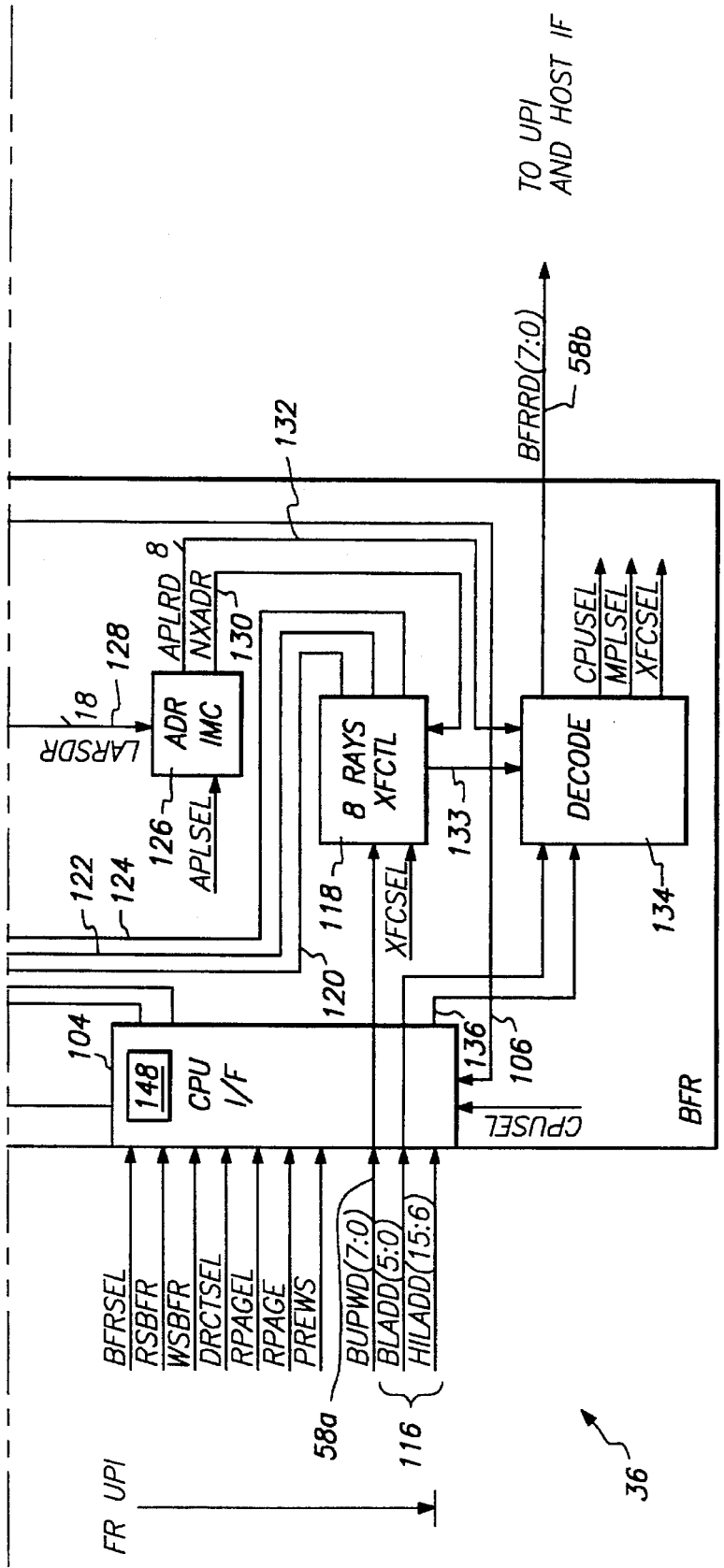

SHARED MEMORY ARRAY FOR DATA BLOCK AND CONTROL PROGRAM STORAGE IN DISK DRIVE

FIELD OF THE INVENTION

The present invention relates to an architecture for a disk drive data storage device. More particularly, the present invention relates to a disk drive architecture including a shared memory array for temporary storage of data blocks in transfer and control program routines, wherein an embedded, programmed microcontroller, a data sequencer, and a host interface controller are provided with direct access into the shared memory array.

BACKGROUND OF THE INVENTION

Previous recent disk drive architectures have included embedded programmed digital micro controllers for controlling various functions of the disk drive, including, for example, tasks such as head positioning, spindle motor speed regulation, read channel adjustments for zoned data recording, and data block transfer and supervision in response to commands received from a host computing system. These prior designs have typically included a large data cache memory array for temporary storage of multiple data blocks in transit between the disk data storage surface and the host computing system. Separately, the embedded microcontroller has typically required internal and external read only program memory (ROM) for storage and retrieval of control program routines, and scratchpad random access memory (RAM) for program variables and tables, etc.

When disk drives were physically larger, and commanded higher prices, designs providing several separate memory chips for program memory and scratchpad access memory, separate and apart of the data block transfer buffer memory, were feasible and then deemed to be cost effective. Two marked trends have brought into focus the drawbacks of these prior approaches. One trend is that disk drives are becoming physically much smaller; and very small form factors in the 2.5" disk diameter and the 1.8" disk diameter size ranges are increasingly in use. Small disk drives require size-reduced electronics circuit boards. In turn, the electronics chips must support multiple functions, and the number of electronics chips must be reduced to a bare minimum. Another requirement is reduction of power consumption in these very small disk drives. The other trend is massive cost reductions presently being required by manufacturers and integrators of computing systems into which small hard disk drives are being installed and used. Separate program and random access memory arrays add significant costs to, and require precious board space on, the electronics printed circuit board portion of the hard disk drive assembly.

The concept of storing control program routines on a data surface of a hard disk drive and calling them for execution as needed is not new. Commonly assigned U.S. Pat. No. 4,396,959 to Harrison et al. (later U.S. Reissue Pat. No. 32,075) describes an arrangement whereby diagnostics routines were stored on the disk and called by the drive's embedded microcontroller for execution as required. In commonly assigned U.S. Pat. No. 4,669,004 to Moon et al., a disk drive was described in which the disk stack had seven cylinder locations reserved for system software. These locations included a dynamic media defect map which was called by the embedded microcontroller as part of its media defect management control routine. U.S. Pat. No. 4,746,998 to Robinson et al. describes a disk drive in which a media defect list supplied by the drive manufacturer was stored on outer tracks of the storage disk. The defect list was then merged with a user-supplied defect list during formatting and used to flag and bypass defective data sector locations. During initialization of the drive, the merged defect list was loaded into a section of memory directly accessible by the embedded drive microcontroller, so that it may take defect locations into account during track seeking operations. Commonly assigned U.S. Pat. No. 5,084,791 to Thanos, et al. describes a disk drive architecture in which the embedded microcontroller was provided with internal and external RAM and ROM. There was also an indirect data path for the microcontroller to the block buffer memory so that error correction operations could be performed on data blocks in transit before delivery to the host computer.

An example of this indirect data path is provided in the FIG. 1 illustration of prior art. In FIG. 1 within a hard disk drive architecture a drive microprocessor was connected to a microcontroller interface. The interface was within a drive electronics chip including a memory controller. The memory controller generated addresses and supervised data block transfers into and out of a drive cache buffer memory array, either from the disk storage surface, or from a host interface circuit. When the microprocessor desired to write data into the cache buffer array in accordance with a data move instruction, the microprocessor transferred from its accumulator a starting address location into the address register and then a data byte into the data register. When the data byte was placed into the data register, the memory controller then caused the data to be written to the address pointed to in the cache buffer memory array at a subsequent time in the memory access cycle, usually within one or several microseconds after the data byte was stored into the data register. During this delay interval, the microprocessor had to enter a delay, as by executing "no-operation" loops until passage of the maximum time necessary to assure that the memory controller had transferred the byte to the cache buffer array. After this delay time for data transfer to the memory elapsed, the microprocessor then wrote a second byte into the data register, and thereupon an incrementing function (noted as "+ 1" in FIG. 1) automatically incremented the address register value by one. This indirect data transfer procedure was then repeated, with the microprocessor waiting for the delay time needed to transfer the second byte, before sending a third byte, etc. This "double-clutching" procedure through the data register then continued until all of the data bytes of a string were sent to the buffer memory array.

During reading operations, the microprocessor would load a starting address into the address register, and then wait for the delay time needed by the memory controller in fetching the byte from the cache buffer memory array into the data register. The act of reading the data from the register by the microprocessor then caused the address incrementer to increment the address by one, and the next byte was fetched and temporarily stored in the data register until it was accessed by the drive microprocessor. This process continued until the block of data bytes desired to be read by the microprocessor was fetched and transferred via the data register. The act of accessing the data register, whether for read or write, were carried out by the microprocessor via a "move" instruction. These external data transfer operations were instruction-intensive, and the external cache buffer memory array did not appear as address space to the microprocessor. Also, transfers were restricted to and from the accumulator of the microprocessor, and instructions were not capable of being fetched from the external array into the instruction register and then executed.

As illustrated by the foregoing example, the use of a single memory chip to store data blocks in transit as well as control program routines, variables and tables has presented a number of difficult problems for the disk drive designer. In order for the embedded disk drive controller to execute its control program routines from the single memory, the memory controller must have sufficient reserve bandwidth to allocate direct access to the microcontroller in order to achieve reasonable code execution performance. The block buffer memory must appear to the microcontroller to be directly addressable within the micro controller's limited direct address space. Synchronization of the microcontroller and the block buffer controller is required when other users need to have direct access to the buffer at the same instant as may be needed by the microcontroller. At least three memory segments must be defined at all times: a first segment for data blocks in transit; a second segment for the current control program routine being executed by the microcontroller, and a third segment for scratchpad memory for variables and tables.

The present invention provides a solution to the hitherto unsolved problems associated with use of a shared memory for both data block and control program storage within a disk drive.

SUMMARY OF THE INVENTION WITH OBJECTS

A general object of the present invention is to provide a single, multi-tasked memory array within the electronics of a hard disk drive in a manner overcoming limitations and drawbacks of the prior art.

A more specific object of the present invention is to provide a single memory chip within the electronics of a hard disk drive which appears to an embedded microcontroller thereof as one or more segments of directly addressable external memory, either for data or program instruction storage.

Another more specific object of the present invention is to provide fixed and floating block segments within the directly addressable external memory space of an embedded digital microcontroller of a hard disk drive in a manner enabling mapping of the controller's external memory space directly to a single larger memory array.

Yet another specific object of the present invention is to provide methods and circuitry for synchronizing and controlling data storage and transfer operations of a single, multi-tasked memory array within electronics of a hard disk drive so that time critical accesses and transfers are properly carried out.

Still one more specific object of the present invention is to provide methods and apparatus for controlling and refreshing dynamic RAM buffer memory so that it may serve as a multi-tasked temporary memory storage resource within a hard disk drive and so as to improve efficiency and increase bandwidth of the buffer memory.

Yet another more specific object of the present invention is to provide a hard disk drive architecture including an embedded microcontroller and enabling control firmware to be distributed between internal program memory of the microcontroller and reserved data tracks of a rotating data storage disk such that at disk initialization, the firmware stored on disk is transferred to a single multitasked memory array of the drive and then directly executed by the microcontroller as required. At the same time, the memory array is also providing temporary storage for data blocks in transit between a host computer and the storage surface of the rotating data storage disk.

Yet one more specific object of the present invention is to provide a micro-Winchester hard disk drive architecture with size-reduced, and power-reduced, electronics by providing a dynamic random access memory (DRAM) array for storage of drive control program routines, variables and tables, and multiple data blocks in transit.

Yet another specific object of the present invention is to provide an improved buffer memory controller for use within a hard disk drive in a manner enabling a single memory array or device to provide storage of, and access to, control firmware, variables and tables for a drive microcontroller, and data blocks in transit between the host and the disk drive data storage surfaces.

Still one more object of the present invention is to provide methods for dynamic allocation of segments of a buffer memory array of a disk drive so that the may store drive control firmware routines, variables and tables associated with operation of an embedded drive microcontroller.

Still another object of the present invention is to provide a disk drive architecture which enables an embedded digital microcontroller to have direct access to a data block buffer, so that control routines may be transferred from the disk or from an external location into the data block buffer and then directly accessed and executed by the microcontroller, while data blocks in transit between the disk and an external location are simultaneously temporarily stored in the data block buffer.

One more object of the present invention is to provide a disk drive architecture which provides a randomly addressable small cache directly accessible by an embedded digital microcontroller, the small cache being an extension of a larger external memory array, so that once values requested by the microcontroller are transferred from the larger external memory array into the small cache, the values may then be delivered directly to the microcontroller in accordance with its timing requirements for obtaining program instructions and data.

Yet another object of the present invention is to provide improvements in a disk drive architecture by which dynamic random access memory may efficiently store and retrieve user data blocks, tables and program instructions for a drive microcontroller by greater utilization of page mode addressing techniques.

In accordance with principles of the present invention, a disk drive includes a base, a data storage disk rotating relative to the base, a data transducer positioned relative to the disk for transducing serial data to and from the disk, a programmed microcontroller for controlling data transfers between the disk drive and a host computing system, for controlling positioning of the transducer means, and for controlling rotation of the data storage disk, a buffer memory array for temporary storage of data blocks in transit between the disk drive and a host, a host interface for transferring data blocks between the host and the buffer memory array, a sequencer for transferring data blocks between the buffer memory array and the data storage disk by converting blocks to and from serial data and for detecting predetermined data storage locations on the data storage disk, a microcontroller interface circuit including a memory translation circuit for translating external direct addresses put out by the microcontroller into addresses for addressing the buffer memory array, a buffer memory controller circuit including an arbitration circuit for arbitrating access requests by the microcontroller, the sequencer and the host interface, and a microcontroller cache buffer for temporarily storing at least a second byte of a data word sought by the microcontroller from the cache buffer as a first byte of the data word is transferred directly from the cache buffer to the microcontroller.

In accordance with a separate facet of the present invention, a disk drive architecture includes a rotating data storage disk, a positionable data transducer for writing data to, and reading data from, concentric track locations defined on the disk, a preamplifier/driver connected to the data transducer, a read/write channel connected to the preamplifier/driver, a sequencer circuit including a sequencer FIFO buffer memory for transferring user data blocks between the data storage disk and the sequencer FIFO buffer memory, a host interface controller including an interface FIFO buffer memory for transferring user data blocks, commands and status values between a host computer and the interface FIFO buffer memory, a cache buffer for storing data blocks in transit between the sequencer and the host interface controller, a buffer controller for controlling accesses to the cache buffer, a programmed digital microcontroller for decoding and executing commands received from the host computer and for controlling positioning of the data transducer. Within this architecture an improvement is provided for enabling direct access by the microcontroller to the cache buffer. The improvement includes:

a microcontroller interface circuit connected between the microcontroller and the buffer controller, the microcontroller interface circuit including address mapping registers for mapping at least one predetermined portion of directly addressable memory of the microcontroller to address locations of the cache buffer, the buffer controller circuit including an access arbitration circuit for arbitrating requests for access to the cache buffer by the sequencer, the host interface controller and the microcontroller, and a microcontroller wait state generator responsive to the access arbitration circuit for generating and applying a wait state sequence to the microcontroller until a request it makes for access to the cache buffer can be executed.

As one aspect of this facet of the invention, the cache buffer comprises a single dynamic random access memory chip defining a storage array, and the arbitration circuit further arbitrates requests for memory refresh operations generated by the buffer controller.

As a separate facet of the present invention, a method is provided for sharing a single buffer memory in a disk drive between a data transfer path between a storage disk and a host computer and an embedded digital microcontroller for controlling data storage and retrieval operations of the disk drive whereby the embedded digital microcontroller has direct access within its address space to any of the storage locations of the buffer memory. The method comprises the steps of:

mapping at least one predetermined portion of directly addressable memory space of the microcontroller to address locations of the buffer memory, arbitrating requests for access to the buffer memory by a sequencer within the data transfer path, a host interface controller within the data transfer path and the microcontroller, generating and applying a wait state sequence to the microcontroller until a request it makes for access to the buffer memory can be executed as determined by the arbitrating step, and executing the request for access to the buffer memory by the microcontroller by generating and applying a data location address mapped from an address supplied from the microcontroller to buffer memory and transferring data values between the microcontroller and the buffer memory.

As one aspect of this facet of the invention, the mapping step comprises the steps of mapping a plurality of predetermined portions of directly addressable memory space of the microcontroller to plural block address location of the buffer memory.

As another aspect of this facet of the invention, the arbitrating step comprises a further step of assigning access priorities to the sequencer, the host interface controller and the microcontroller.

As a further aspect of this facet of the invention, the buffer memory defines addressable storage locations which are sized to be integral multiples of the data values transferred between the microcontroller and the buffer memory and the step of executing the request for access to the buffer memory by the microcontroller comprises for a first access to a particular address location of the buffer memory the further step of caching a portion of a memory value at the particular address location which is not transferred between the microcontroller and the buffer memory in a microcontroller cache buffer. As a related aspect, the step of executing the request for access to the buffer memory by the microcontroller comprises for a second and successive access to the particular address location of the buffer memory the further step of retrieving the portion from the microcontroller cache buffer.

As one more aspect of this facet of the invention, the buffer memory array comprises two DRAM chips and the buffer memory controller circuit includes circuitry for separately selecting, addressing and refreshing each memory chip.

As a related aspect of this facet of the invention, the buffer memory array comprises a main DRAM memory array, and a plurality of page cache arrays (preferably four), and multiplex circuitry for multiplexing data from each said page cache array onto a bus leading from the cache buffer.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 4A and 4B together provide a more detailed electrical block diagram of a buffer controller block within the drive electronics IC of the FIG. 2 architecture. FIG. 4 comprises a layout plan for the FIGS. 4A and 4B drawing sheets.

DETAILED DESCRIPTION OF A PREFERRED EMBODIMENT

Figure 1:
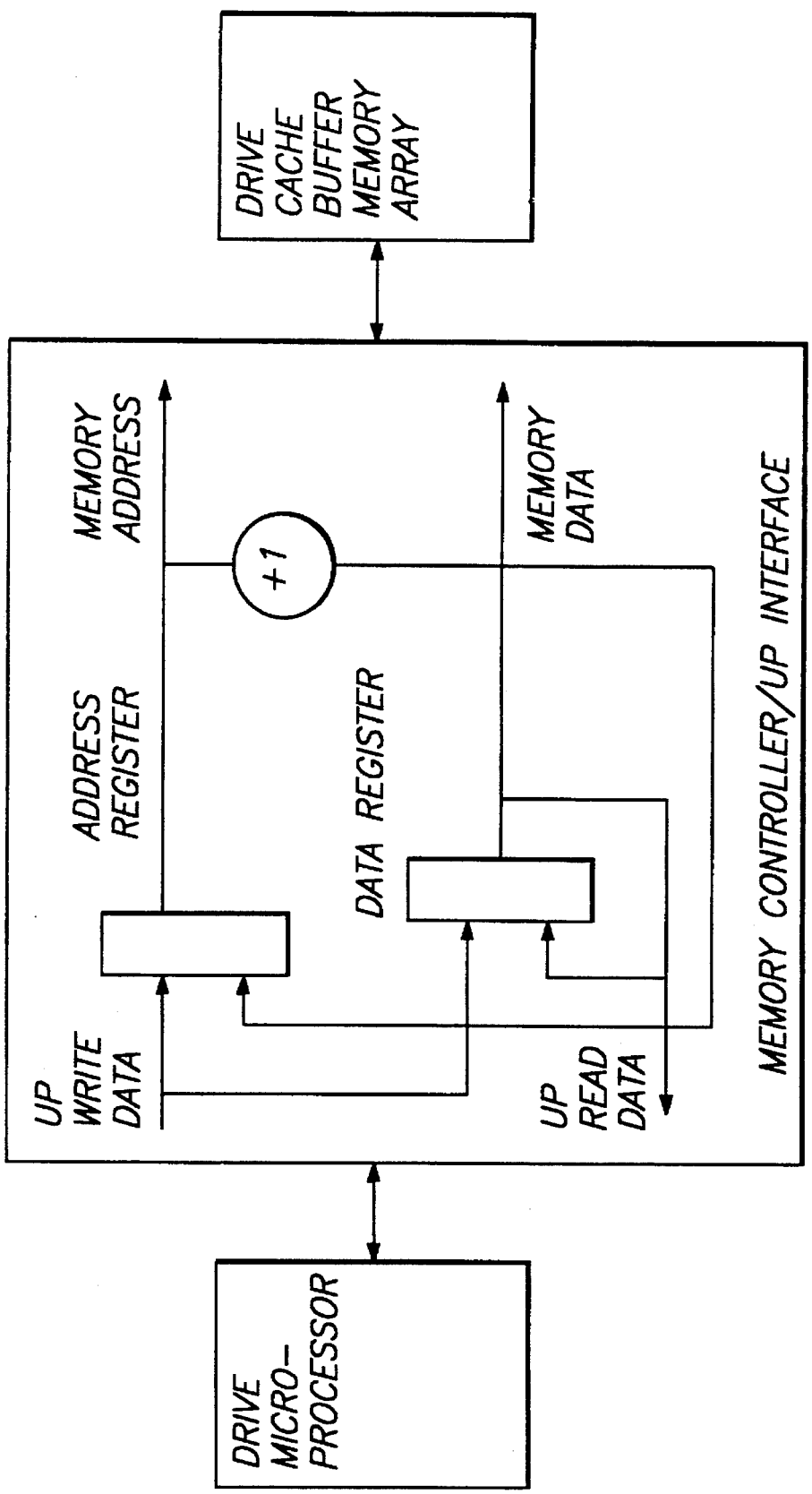
FIG. 1 is a simplified block diagram illustrating a prior architecture for providing indirect access by an embedded disk drive microprocessor to a drive cache buffer memory array via address and data registers of a memory controller/ microprocessor interface circuit.
Figure 2:
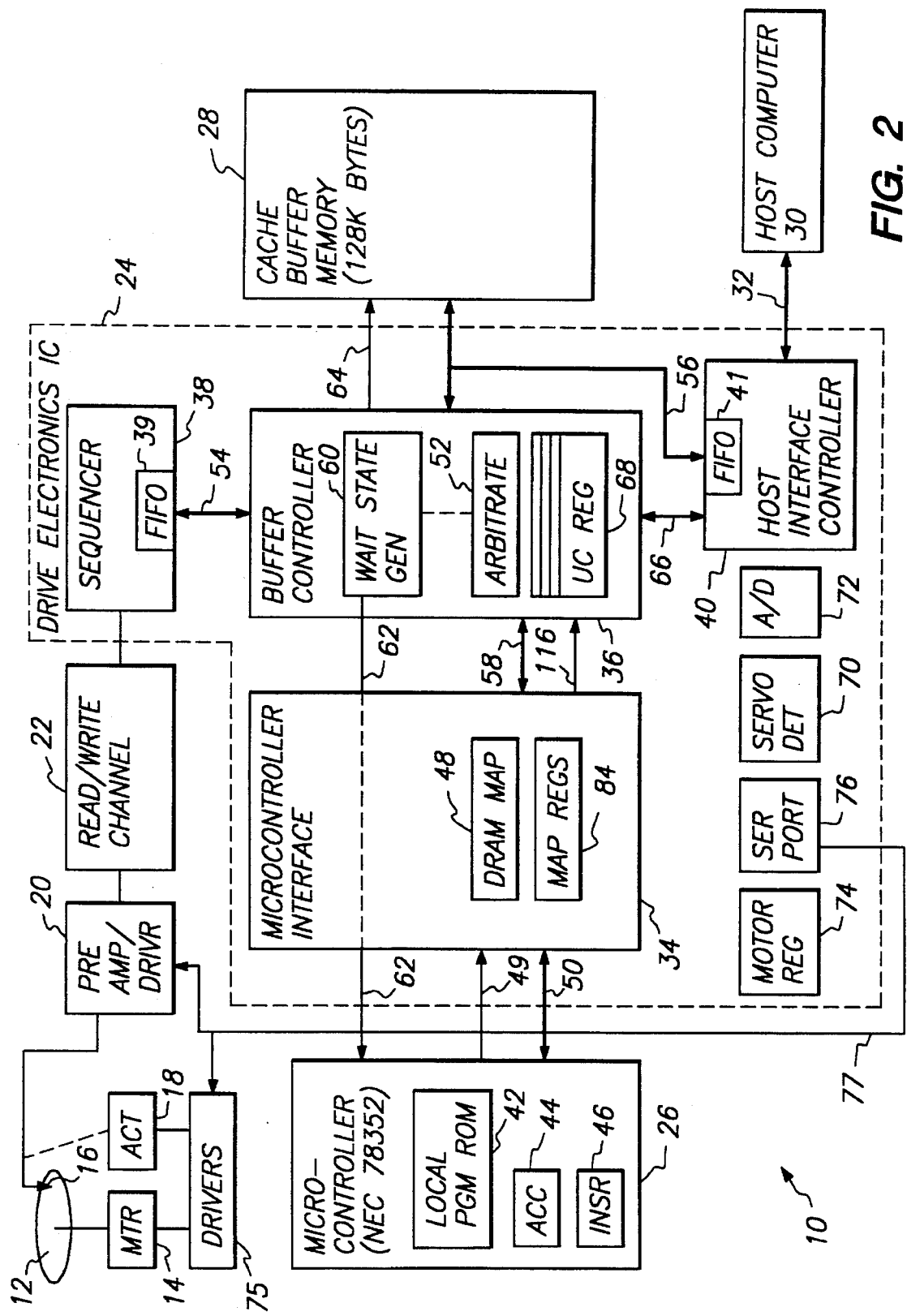
FIG. 2 is a simplified, overall electrical block diagram of a miniature hard disk drive architecture incorporating principles including an embedded microcontroller and wherein the control firmware is distributed between a local internal program memory of the microcontroller and a multitasked memory array of the drive, in accordance with principles of the present invention.

FIG. 2 sets forth a block diagram of portions of a disk drive architecture which are pertinent to an understanding and appreciation of the present invention. An exemplary disk drive 10 includes a rotating data storage disk 12, a spindle motor 14 for rotating the disk 12 at a predetermined rotational velocity. In the case of a Winchester or "flying head" disk drive, the velocity must be sufficient to sustain flying characteristics of a slider carrying a data transducer head 16; typically the rotational velocity will be in a range between 3000 RPM and 6000 RPM. An actuator structure 18 is mechanically linked to the data transducer head 16 and functions to position the head 16 at each selected one of e.g. a multiplicity of concentric data tracks defined on the e.g. thin film magnetic recording surface of the data storage disk 12. The rotating disk 12, spindle motor 14, transducer 16 and actuator 18 are conventionally included within an enclosed housing known as a "head and disk assembly" in the hard disk drive art.

The data transducer head 16 is electrically coupled to a preamplifier/head selector/write driver circuit 20 which frequently also is included in the head and disk assembly in order to be close to the head 16 and thereby minimize pickup of extraneous electrical noise, etc. The circuit 20 is electrically connected to a read/write channel 22 which performs the task of converting digital information into analog information, and vice versa.

Other discrete circuit elements of the exemplary disk drive 10 include a multi-function drive electronics IC chip 24, an embedded, programmed digital microcontroller 26 and a single memory array 28. A host computer 30 sends commands and data blocks for storage to the disk drive 10 via a digital signal path 32. The interface 32 is preferably a bus level interface, and may follow the SCSI II protocol, the AT interface, the PCMCIA interface, or any other suitable, bus level interface convention.

The drive electronics integrated circuit 24 includes a microcontroller interface circuit 34 for interfacing directly with the microcontroller 26. The electronics chip also includes a buffer controller circuit 36 for addressing and refreshing the buffer memory array 28. A data sequencer 38 is included in the chip 24 for sequencing digital data blocks to and from defined data block storage locations on the disk as a coded serial information stream. The sequencer 38 includes a small on-board first-in, first-out (FIFO) buffer 39 which, in this preferred example has a capacity for six 16 bit words (12 bytes). A host interface controller circuit 40 is also included in the interface chip 24. The interface circuit 40 implements the predetermined interface convention and provides direct communications with, and data block transfers between, the host computer 30 via the bus structure 32. The host interface controller circuit 40 also includes e.g. a four word FIFO 41 for temporary storage of up to four data, command or status words at a time. A sixteen bit data bus 56 leads from the FIFO 41 to the buffer controller 36 and also directly to the cache buffer memory 28.

The microcontroller 26 is a fully programmable digital microprocessor or microcontroller. It includes among many architectural features an on-board local program read only memory (ROM) 42, an accumulator register 44, and an instruction register 46. In accordance with principles of the present invention, data bytes may be transferred directly to and from the accumulator 44 and the buffer array 28. Instruction bytes may be transferred directly to the instruction register 46 from the buffer 28, from a microcontroller cache register 68 in the buffer controller, or from the local program ROM 42. Direct access to the buffer 28 is made possible and facilitated by a DRAM mapping circuit 48 in the microcontroller interface 34. The mapping circuit 48 includes a plurality of programmable registers which translate addresses on an external address bus structure 49 of the microcontroller 26 into addresses of like-size blocks which may be located anywhere within the larger-sized cache buffer 28. The resultant data values pass between the microcontroller 26 and the interface circuit 34 via a bi-directional, time-multiplexed data/address bus 50 in which e.g., the lower eight address lines are time shared with the data lines, in conventional fashion, in order to reduce the number of external connections for both the microcontroller 26 and for the electronics chip 24.

Within the buffer controller circuit 36 an arbitration state machine controller circuit 52 receives data transfer requests via at least three separate paths: a path 54 from the FIFO 39 of the sequencer 38, a path 56 from the FIFO 41 of the host interface circuit 40, and a path 58 from the microcontroller interface circuit 34. The path 56 also extends directly to the cache buffer memory 28. While data transfers between the host interface controller 40 and the cache buffer memory 28 are carried out under the control of the buffer controller 36, the data blocks on the bus 56 bypass the buffer controller in reaching the host interface controller. All other data block transfers pass through the buffer controller before reaching either the sequencer 38 or the microcontroller interface 34.

Arbitration occurs in accordance with a predetermined priority. The highest priority is accorded to the sequencer FIFO 39, since transfers to the disk must occur in synchronism with rotation of the disk 12. Otherwise, delays incident to multiple rotations of the disk will be incurred in storing or retrieving a user data block. The second highest priority is accorded to a refresh function provided by the buffer controller 36 when the cache buffer is implemented with dynamic memory. (If static memory is used for the cache buffer array, the refresh function is eliminated.) The next highest priority may be afforded either to the interface controller 40 or to the microcontroller interface 34. The circuit receiving this priority is programmable, and typically will be accorded to the microcontroller 26, unless the data transfer rate at the interface 32 is sufficiently high as to require additional bandwidth of the cache buffer 28. For SCSI transfers at five megabits per second, no drawbacks are incurred in placing the microcontroller interface 34 above the host interface controller 40 in terms of arbitration priority.

In order for the microcontroller 26 to be able to function within the architecture of the disk drive 10, the microcontroller 26 must support an externally supplied wait state signal. One satisfactory microcontroller which supports externally commanded wait states is the NEC 78352, or equivalent. A wait state generator circuit 60 within the buffer controller circuit 36 monitors the priorities set by the arbitration circuit 52 (as denoted by the dashed line in FIG. 2 between the arbitration circuit 52 and the wait state generator 60). In the event that the arbitration circuit 52 detects a collision of incoming buffer service requests from the microcontroller 26 and a higher priority circuit, such as the sequencer 38, the arbitration circuit 52 will recognize the higher priority buffer access request, and the wait state generator 60 will simultaneously generate and put out a wait state command over a line 62 to place the microcontroller 26 into a wait state until its request for access to the buffer 28 can be honored. One example of arbitration between simultaneous access requests from the sequencer 38 and the microcontroller 26 is discussed below in conjunction with FIG. 9.

The drive electronics circuit 24 also includes a servo sector decoder circuit 70 which functions to decode embedded servo track identification information recorded in each servo sector and supply the recovered information to the microcontroller 26. The servo decoder circuit 70 is preferably in accordance with commonly assigned, copending U.S. patent application Ser. No. 07/710,172 filed on Jun. 4, 1991, entitled "Asynchronous Data Reader for Embedded Sector Servo Disk Drive", the disclosure thereof being incorporated herein by reference. An analog to digital converter circuit 72 sequentially converts sampled peak amplitudes taken from fine position bursts recorded in each servo sector. The quantified amplitude values are also supplied to the microcontroller 26. A motor speed regulator circuit 74 enables the microcontroller 26 to provide precise spindle speed regulation for the spindle motor 14 via a motors driver circuit 75. Also, a serial data port circuit 76 enables serial communications to be carried out via serial control path 77 with the motors driver circuit and with the read/write channel 22, so that data transfer rates may be commanded for each radial zone of tracks defined on the disk 12, so that zoned data recording techniques may be implemented to increase areal density on the disk 12.

In the presently preferred embodiment, the concentric data tracks defined on the storage surface(s) of the disk 12 are interrupted by a series of spaced apart, embedded servo sectors. These sectors may follow a pattern as described in commonly assigned U.S. Pat. No. 5,170,299 to Moon, entitled "Edge Servo for Disk Drive Head Positioner", the disclosure thereof being incorporated herein by reference. The microcontroller 26 preferably includes time-critical program routines within its own local program memory 42, in accordance with the teachings of the referenced, commonly assigned U.S. Pat. No. 5,084,791, the disclosure thereof being hereby incorporated by reference. These routines typically include servo interrupt service routines for controlling head position via the actuator structure 18. An interrupt of the microcontroller 26 occurs incident arrival of each servo sector underneath the data transducer head 16. Spindle motor speed regulation routines may also be executed by the microcontroller during each servo interrupt service routine. A bootstrap loader program routine is also typically included within the local program ROM 42, so that the drive 10 may be initialized at power-on reset, and so that firmware routines stored on reserved data tracks of the disk 12 may be accessed and transferred into the cache buffer 28, and thence to the instruction register 46 of the microcontroller 16 on a byte-by-byte basis. Also, burn-in and test routines incident to disk drive manufacture and maintenance may be supplied via the interface structure 32 or from the disk 12, and executed by the microcontroller 26 without having to provide a separate program memory or special test fixturing. Firmware updates and special configurations may easily be provided by enabling the microcontroller 26 to access instructions in the cache buffer and directly execute them. Execution of an instruction by the microcontroller 26 begins once the instruction is loaded into the instruction register 46.

Figure 3:
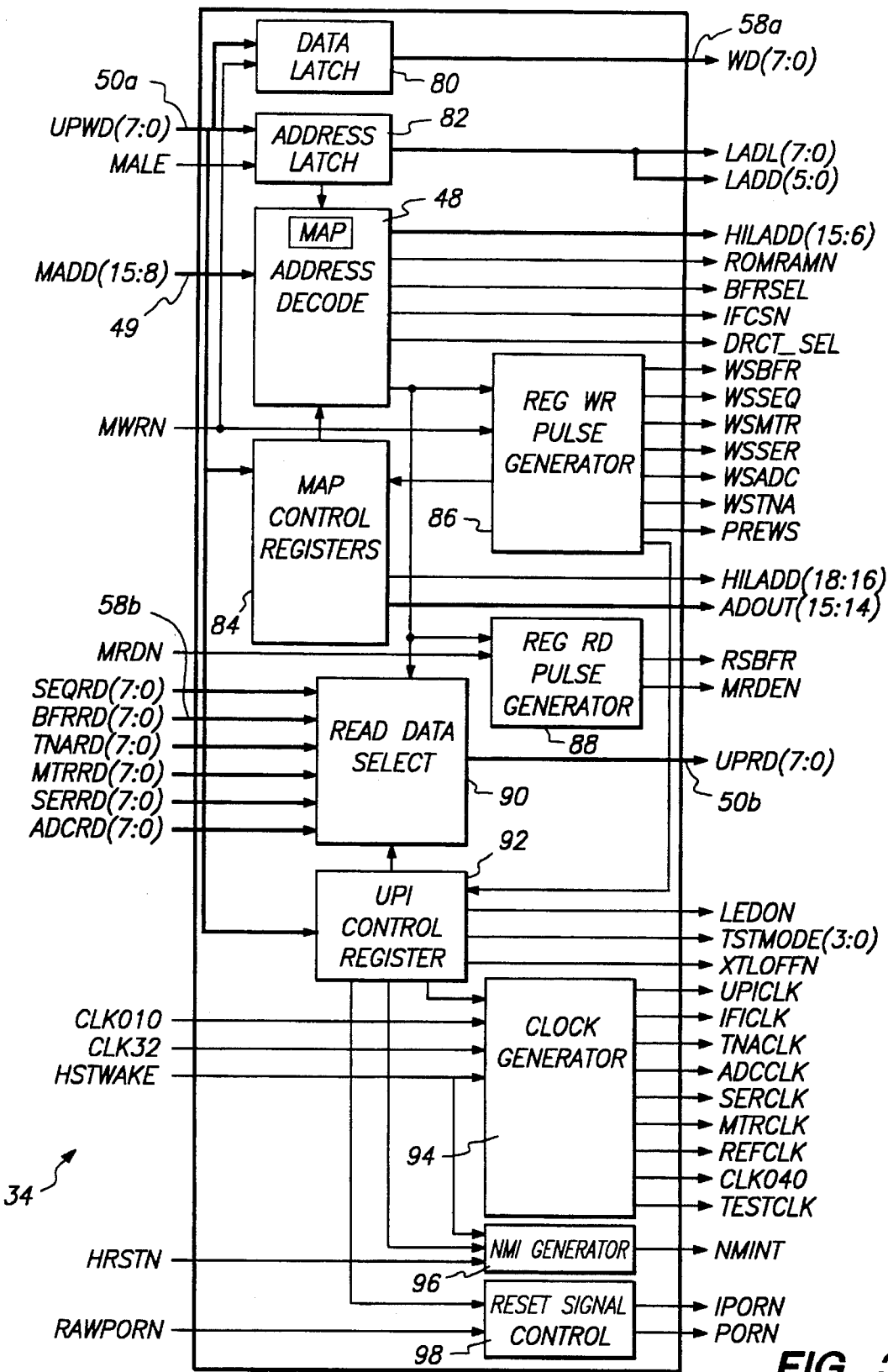
FIG. 3 is a more detailed electrical block diagram of a microcontroller interface block within the drive electronics IC of the FIG. 2 architecture.

FIG. 3 sets forth in greater detail the microcontroller interface circuit 34 implemented within the drive electronics chip 24. As shown in FIG. 3, the microcontroller address/data bus 50 includes a micro write-mode path 50a and a micro read-mode path 50b. The write-mode functional path extends to a data latch 80, an address latch 82, a microcontroller address control circuit 84, and a microcontroller control registers array 92. The data latch 80 is enabled by a micro-write-not line (MWRN) which also enables a register write pulse generator 86. The address latch 82 is enabled by a micro address latch enable line (MALE) and enables the eight low order address bits of the 16 bit microcontroller address space to be latched and then applied to the address decode mapping circuit 48 during a data access cycle. An output is also supplied via a local address bus (LADD) to other elements of the drive architecture. The micro address bus 49, comprising e.g., the eight high order bits of e.g., the 16 bit address space which is directly addressable by the microcontroller 26 (64 KBytes), feeds directly into the address decode mapping circuit 48.

The mapping circuit 48 responds to programmable map registers in the control array 84 for translating direct addressing by the microcontroller 26 to e.g. contiguous 2K byte segments of the cache buffer 28 via a high local address bus (HILADD). The circuit 48 also decodes addresses into circuit enables from the microcontroller directed to the buffer controller 36, the sequencer 38 and the interface controller 40.

The register write pulse generator circuit 86 generates and puts out write pulse enables from the microcontroller 26 in order separately to strobe the buffer controller 36, the interface controller 40, the sequencer 38, the servo circuit 70, the analog to digital converter circuit 72, the motor speed regulator circuit 74 and the serial port circuit 76 when the microcontroller 26 desires to write data to their respective register arrays.

The programmable registers for controlling mapping within the address decode mapping circuit 48 are included in the micro address control block 84. These registers are loaded directly from the data bus 50a and result in the translation of addresses which occurs in the address decode mapping circuit 48. In this manner, the address translation for translating addresses into the buffer memory 28 is fully programmable and may be changed dynamically by the microcontroller 26.

The register read pulse generator 88 generates read mode strobes which are put out to the buffer controller 36 to synchronize byte transfers to the microcontroller 26 from the buffer controller 36. A read data select circuit 90 is controlled by the micro control register block 92. The circuit 90 selects one of a plurality of incoming data buses, including paths from the sequencer 38, the buffer controller 36, the servo decoder 70, the motor regulator circuit 74, the serial data port circuit 76 and the analog to digital converter 72. One of these buses is enabled during a microcontroller read sequence and passes its eight bits of data through the circuit 90 to the microcontroller via the read mode path 50b.

The microcontroller control register 92 enables the microcontroller to assert certain flag values which control various operations of the interface circuit 34, including a clock generator circuit 94 which generates a plurality of clock signals for the microcontroller 26, the interface controller 40, the servo decoder 70, the analog to digital converter 72, the serial port circuit 76, and the motor regulator circuit 74. A non-maskable interrupt generator circuit 96 generates and puts out a non-maskable interrupt to the microcontroller 26 whenever a circuit, such as the servo circuit 70, or the interface circuit 40 asserts a host reset control signal (HRSTN). A circuit 98 generates a power on reset signal whenever it is enabled by the microcontroller control register 92 and whenever a raw power on reset signal is received.

Figure 4A:
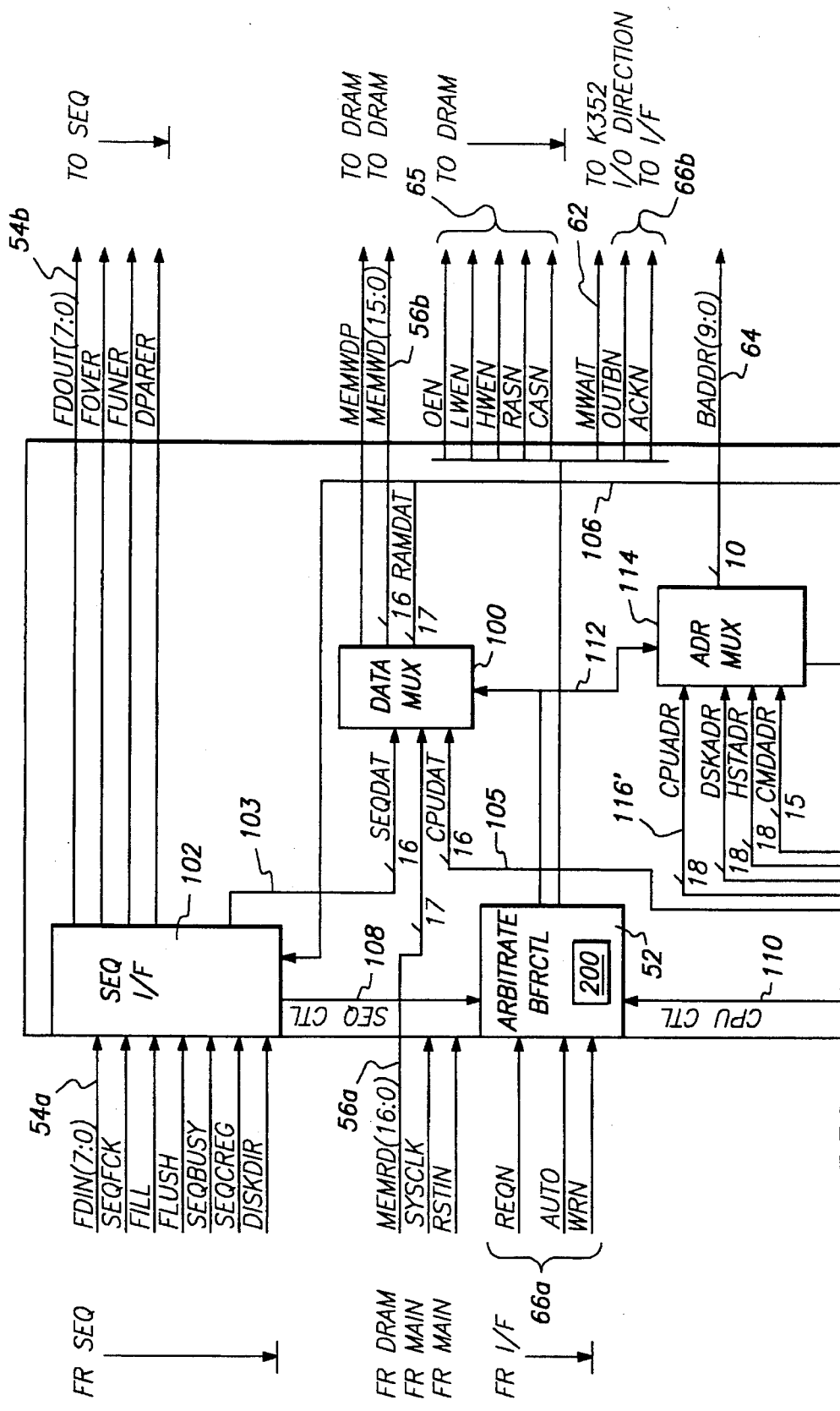

FIGS. 4A and 4B present a more detailed view of the buffer controller 36. A data multiplexer 100 receives data from the cache memory buffer 28 over an incoming path 56a, data from a sequencer interface block 102 over an internal path 103 and data from a microcontroller interface 104 via an internal path 105, and selects between these three incoming data paths. (The microcontroller interface 104 is an internal circuit within the buffer controller 36 and is not the microcontroller interface circuit illustrated in FIGS. 2 and 3 and discussed in connection therewith.) Depending upon data flow direction, the multiplexer 100 puts out data to the buffer memory 28 via an outgoing path 56b or puts out data over an internal path 106 to either the sequencer interface 102 or to the microcontroller interface circuit 104. In this sense the buffer controller 36 implements internal direct memory access (DMA) channels for the sequencer 38 and for the microcontroller 26. The DMA channel between the host interface 40 and the buffer 28 is external to the memory controller 36, although it controls operations of that DMA channel directly.

In order to perform its memory access arbitration function, the arbitration circuit 52 within the buffer controller 36 receives control signal inputs via an incoming path 66a from the host interface controller 40, receives control signals via an internal path 108 from the sequencer interface 102, and receives control signals via an internal path 110 from the microcontroller interface 104. The arbitration circuit 52 also generates and puts out over the path 65 the periodic row and column refresh signals as are needed for conventional refresh of the dynamic cache buffer memory array 28 and also functions to multiplex the ten-bit address bus 64 so that the full extent of the e.g. 128 kbyte memory 28 is addressable with only eight address lines (in combination with row and column select control lines 65). (For a 512 kilobyte array, nine by nine, or eight by ten address lines are employed, depending upon the architecture of the memory array 28). The arbitrate circuit also generates and puts out selection control signals via a path 112 for controlling data path selection operations of the data multiplexer circuit 100 and an address multiplexer circuit 114.

The address multiplexer circuit 114 memory addresses from four sources, microcontroller addresses supplied from the microcontroller interface 104 via a path 116, disk addresses supplied from a transfer control circuit 118 via a path 120, host addresses supplied from the transfer control circuit 118 via a path 122, and command transfer addresses supplied from the transfer control circuit 118 via a path 124 (e.g., to improve SCSI II performance). The transfer control circuit 118 includes e.g. eight internal address registers which are addressable by the microcontroller 26 under firmware control in order to set starting address DMA pointers. An address incrementer circuit 126 provides successive address values in response from a last address value received from the address multiplexer 114 via a path 128, and supplies these values over a path 130 to the transfer control circuit 118 and to the microcontroller interface circuit 104. The incrementer circuit 126 also includes internal rollover and reload registers which are programmed to mark the boundaries of each separate segment of buffer memory 28. When an actual count reaches a rollover value, the counts put out by the incrementer 126 return to the starting address of the segment. A path 130 provides a next address value to the transfer control registers 118. Another path 132 enables the microcontroller 26 to read the rollover and reload register values presently stored in their respective registers in the address incrementer circuit 126.

A decode circuit 134 provides a data output over the path 58b to the microcontroller interface 34 from either the buffer memory 28 via the path 106 and the local CPU interface 104 and a path 136, from the address incrementer circuit 126 via the path 132, or from the transfer control registers 118 via a path 133. The decode circuit 134 also decodes certain functional control signals including a CPUSEL control signal which enables the local CPU interface block 104, an AP1SEL control signal which enables the address incrementer circuit 126, and an XFCSEL control signal which enables the transfer control circuit 118.

Figure 5:
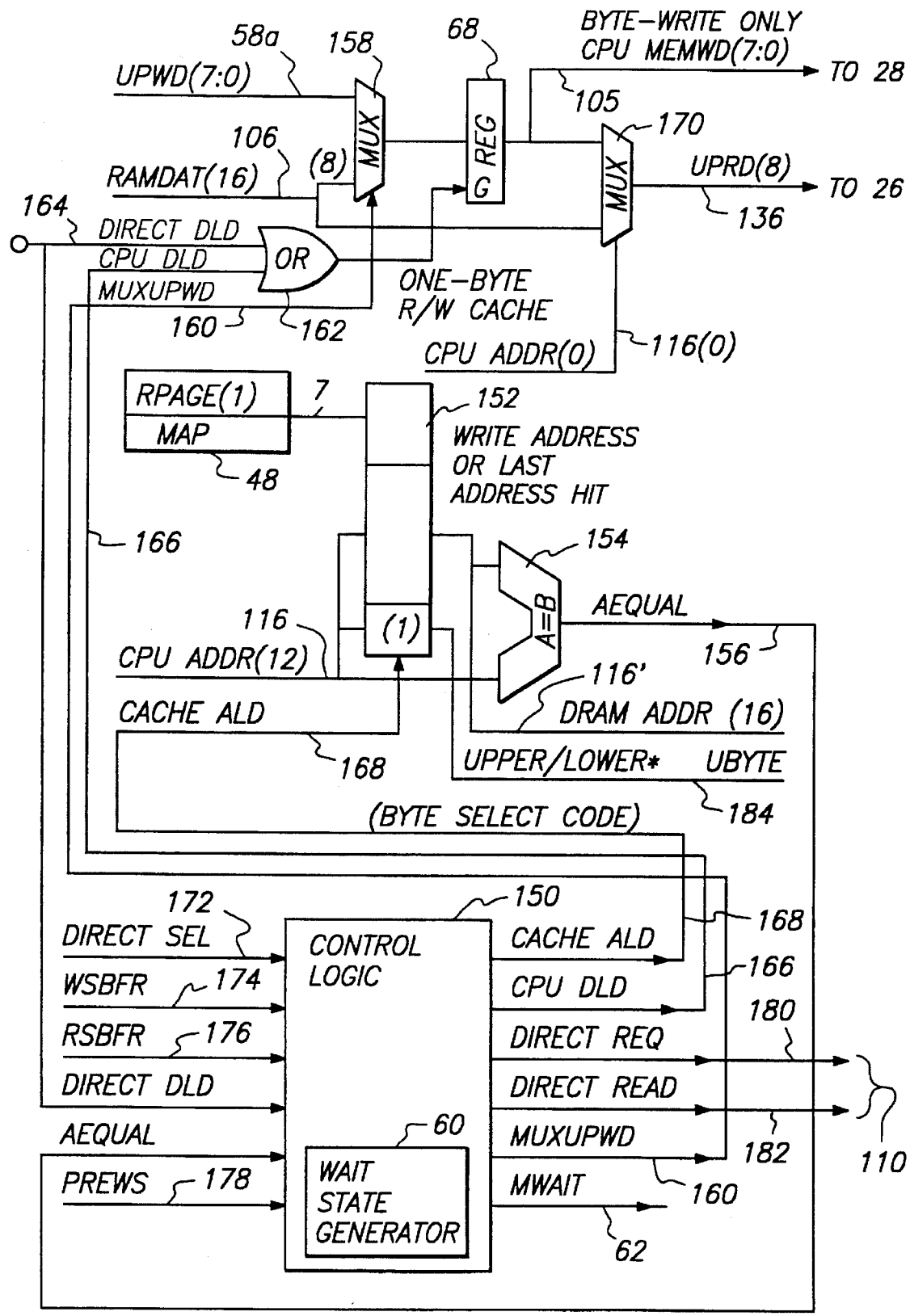
FIG. 5 is a more detailed electrical block diagram of a buffer-direct access block within the FIG. 4 buffer controller block.

Turning now to FIG. 5, a buffer direct access circuit 148 within the microcontroller interface 104 includes the microcontroller data cache 68, as well as other logic required to implement direct access by the microcontroller 26 to and from the external cache buffer memory 28. A control logic circuit 150 includes the wait state generator 60. The logic circuit 150 responds to a request for direct access by the microcontroller 26 and first determines whether the byte value being sought by the microcontroller 26 is presently resident in the microcontroller cache array 68. If so, the control circuit 150 generates a signal to enable the register array 168 and put out the byte being sought. If the requested byte is not present in the microcontroller cache 68, the control logic circuit 150 passes a value to the buffer controller arbitration circuit 52 via the control path 110 which thereupon causes arbitration of the micro controller's request for direct access to the cache buffer memory 28. If there are higher priority access requests then pending, the arbitration circuit 52 signals this fact to the control logic circuit 150, and it causes the wait state generator 60 to generate appropriate wait states and put them out via the path 62 to place the microcontroller 26 into a wait state, pending access to the buffer memory 28.

The buffer direct access circuit 148 also includes an address register 152 and an address comparator 154. The comparator circuit 154 compares the last address from the microcontroller 26 with the present address being asserted by the microcontroller 26. If the two addresses are equal (except for the lowest address bit position which must be a "one", indicating that the high byte is being sought), a signal line 156 (AEQUAL) feeds back to the control logic 150, and that circuit then determines that the desired byte is located in the microcontroller cache 68, and it is then put out through a multiplexer 170 to the microcontroller data bus 136 and is read by the microcontroller with a minimum delay (typically only one wait state, due to transit delays in the electronics chip 24). Otherwise, if the comparison is not equal, the control logic circuit 150 determines that a data read cycle is required by the microcontroller 16 of the buffer memory 28, and asserts an arbitration request via a control line 180 which is included within the data path 110 leading to the arbitration circuit. At the same time the circuit 150 asserts the microcontroller wait line 62 until data from the buffer 28 is available at the micro controller's external data bus 50. While the presently preferred embodiment limits the microcontroller cache 68 to a single byte, it is clearly contemplated that multiple bytes or values may be stored in an expanded cache register array 68, as denoted by the multiple storage bins associated with the register array 28 in FIG. 2.

When the microcontroller 26 desires to write a byte into the drive buffer memory 28, the circuit 148 is first enabled by assertion of a control line 172 (DIRECT_SEL) which enters the control logic circuit 150. This signal on the line 172 indicates that the microcontroller 26 is desirous of directly accessing the buffer 28 as determined by assertion of an address by the microcontroller 26 within its external address space which is mapped to the drive buffer 28. If the DIRECT_SEL line is false, the circuit 148 is not operative.

A write strobe signal (WSBFR) on a path 174 informs the control logic circuit 150 that the address being asserted is within the address space of the buffer 28 and is now ready to be latched into the address register 152. The byte value from the microcontroller 26 enters the circuit 148 via the path 58a and passes through a multiplexer 158 to reach the byte register 68. The multiplexer 158 is enabled by a write multiplexer control signal (MUXUPWD) which is generated by the control logic circuit 150 and put out over a path 160. Once the data value from the microcontroller 26 has settled at the input of the byte register 68, the control logic circuit generates a microcontroller write data load signal (CPU_DLD) and applies it through the OR gate 162 to strobe the byte into the register 68. Simultaneously, the destination address for the byte to be written into the buffer 28 is passed via the micro controller's 16 bit address bus 116 into the address register 152. This address register 152 is strobed by an address latch strobe signal (CACHE_ALD) on a path 168. This signal is also generated by the control logic block 150 in response to assertion of the write strobe signal on the path 174. Once the byte to be written is in the byte register 68, and its destination address is in the address register 152, the control logic circuit 150 asserts an access request line 180 (DIRECT_REQ) which extends to the buffer arbitration circuit 52 via the path 110. A NOT state on a companion line 182 (DIRECT_READ) simultaneously informs the arbitration circuit 52 that a microcontroller data write operation, as contrasted with a microcontroller data read operation, is desired at the drive buffer 28.

The buffer 28 may not be available presently to write the byte stored in the byte register 68. When the arbitration circuit 52 determines that free time exists to service the microcontrollers request for memory access, the byte will be written to the memory array 28 from the register 68 via the path 105. At the same time that the address was captured in the address register, the low order address bit was also captured. This low order bit determines whether the byte from the microcontroller 26 is to be written in the upper byte space, or the lower byte space of the 16 bit wide location defined by the other values in the address register. The upper byte/lower byte control is put out to the buffer controller 52 over a control path 184 in order to control the low byte write enable (LWEN) and high byte write enable (HWEN) signals supplied to the array 28 via the control path 65.

If the microcontroller 26 desires to transfer a second byte to the drive buffer memory 28 before the first byte stored in the register 68 has actually been written out to the buffer 28, the control logic 150 determines this fact, and causes the wait state generator 60 to generate a wait state and apply it over a path 62 to place the microcontroller 26 into a wait state before attempting to write the second byte. This precaution is made possible by virtue of a prewrite strobe signal which enters the control logic 150 over a path 178. The prewrite strobe is asserted by logic associated by the microcontroller 26 before the byte value to be written is actually put out over the external data bus 58. Once the first byte is written into the buffer 28, the wait state on the path 62 is discontinued, and the second byte is ready to be loaded into the register 68 in accordance with the sequence just described for the first byte. The high order bits which are latched into the address register 152 come from the mapping circuit 48. The e.g., lower 12 bits (depending upon the size of the direct external address space of the microcontroller 26) of the address applied to the address latch 152 come directly from the micro controller's external address space (4 kilobyte address blocks) and are not translated by the mapping circuit 48.

When the microcontroller 26 desires to read data directly from the drive buffer memory 28, the select signal is asserted over the path 172, and a read strobe signal RSBFR is asserted over a path 176. Simultaneously, the mapped address presently being asserted by the microcontroller 26 is applied via the address bus 116 to one input of a two input address comparator 154. The last address asserted by the microcontroller is latched in the address latch 152, and it is applied to another input of the comparator 154. If the two addresses (except for the lowest order bit position) are identical, the value sought is thereby determined to be located in the microcontroller cache buffer register 68, and it is asserted from the register 68 through the multiplexer 170 and over the micro controller's data read bus 136. Also, the wait state output on the line 62 is shortened, since only transit time within the drive electronics chip 24 is incurred in delivering the byte from the register 68 to the microcontroller 26. Typically, this delay is only one wait state, at a microcontroller clocking period of 62.5 nanoseconds, for example. When the wait state is removed, this removal informs the microcontroller that the data on its external bus is valid.

If the address comparison performed by the comparator 154 determines that the present microcontroller address is different from the last asserted microcontroller address, an inequivalence condition is put out over the path 156 to the control logic circuit 150. The DIRECT_REQ line 180 is set, and the DIRECT_READ line 182 is also set. The microcontroller 26 is placed in a waiting state by assertion of the line 62. The micro controller's buffer read access request is then subjected to arbitration within the arbitration circuit 52. When the requested read cycle is performed by the buffer 26, the data is returned over the path 106. One byte of the retrieved word goes directly onto the microcontroller bus 136, and the other byte of the retrieved word is passed through the multiplexer 158 and latched into the microcontroller byte register 62. The direct data load line 164 is asserted to strobe the data into the register 68. At the same time the present address is strobed into the address register 152 by assertion of the cache address load data line 168 in order to update the address in the register so that a legal cache hit may be determined at the next microcontroller read command. The micro controller's lowest bit line of its address bus, bit zero, determines whether the odd or even byte of a retrieved data word will be shipped to the microcontroller from the multiplexer 170 over the data bus 136.

Ordinarily, the low byte is sent back to the microprocessor 26 directly through the multiplexer 170, and the high byte is stored in the register 68 via operation of the multiplexer 158 as enabled by the multiplexer control signal on the path 160. At the end of the external buffer memory cycle, a signal DIRECT_DLD is input from the buffer controller circuit 36 on a line 164 and informs the circuitry 148 that the buffer 28 has either completed a write cycle, or has completed a read cycle and that the data on the data bus 106 is true and that it may be strobed into the register 68. Thus, the register 68 is strobed by the DIRECT_DLD data load signal on the path 164 via the OR gate 162. Also, the DIRECT_DLD data load signal on the path 164 is used by the control logic circuit 150 to clear the DIRECT_REQ signal which is seeking arbitration of the micro controller's access request by the arbitration circuit 52.

While in the present example the register 68 is described as being limited to holding a single byte, it is clearly contemplated by the inventors that the register 68 may be of larger storage capacity, and have a multiple byte storage capability. The size of the register 68 is most properly determined by taking into account how fast the microcontroller 26 will be able to execute a single instruction being retrieved from the buffer memory 28. Presently, the NEC 78352 microprocessor requires about 300 nanoseconds (10 clock cycles) on average to execute a single instruction. However, use of a reduced instruction set (RISC) controller at the same clock frequency will reduce instruction execution time to only about three clock cycles (75 nanoseconds). Under circumstances of reduced instruction execution times, a register 68 containing 15 bytes (in addition to a present byte being delivered immediately to the microcontroller via the path 136) is preferred. At the same time, the address comparator 154 will look at the address lines above the four low bit lines and will determine that a cache hit has occurred if equivalence is detected. In this example, the four low bit lines are then applied to address particular byte locations within the register array 68. The comparator 154 is extended in function when the register 68 is sized to hold multiple bytes or values.

Also, when the register 68 is sized to hold multiple bytes, prefetching becomes entirely practical, and once a value is requested which is not in the register 68 and a memory access cycle occurs, a page mode access may be executed by the buffer controller 36 in order rapidly to prefetch immediately subsequent bytes from the buffer array 28 into the storage locations of the buffer 68 as it does for the sequencer FIFO 39 and for the host interface FIFO 41. Further details of operation of the buffer controller state machine, including page mode, are described hereinbelow in conjunction with FIG. 8.

Figure 6:
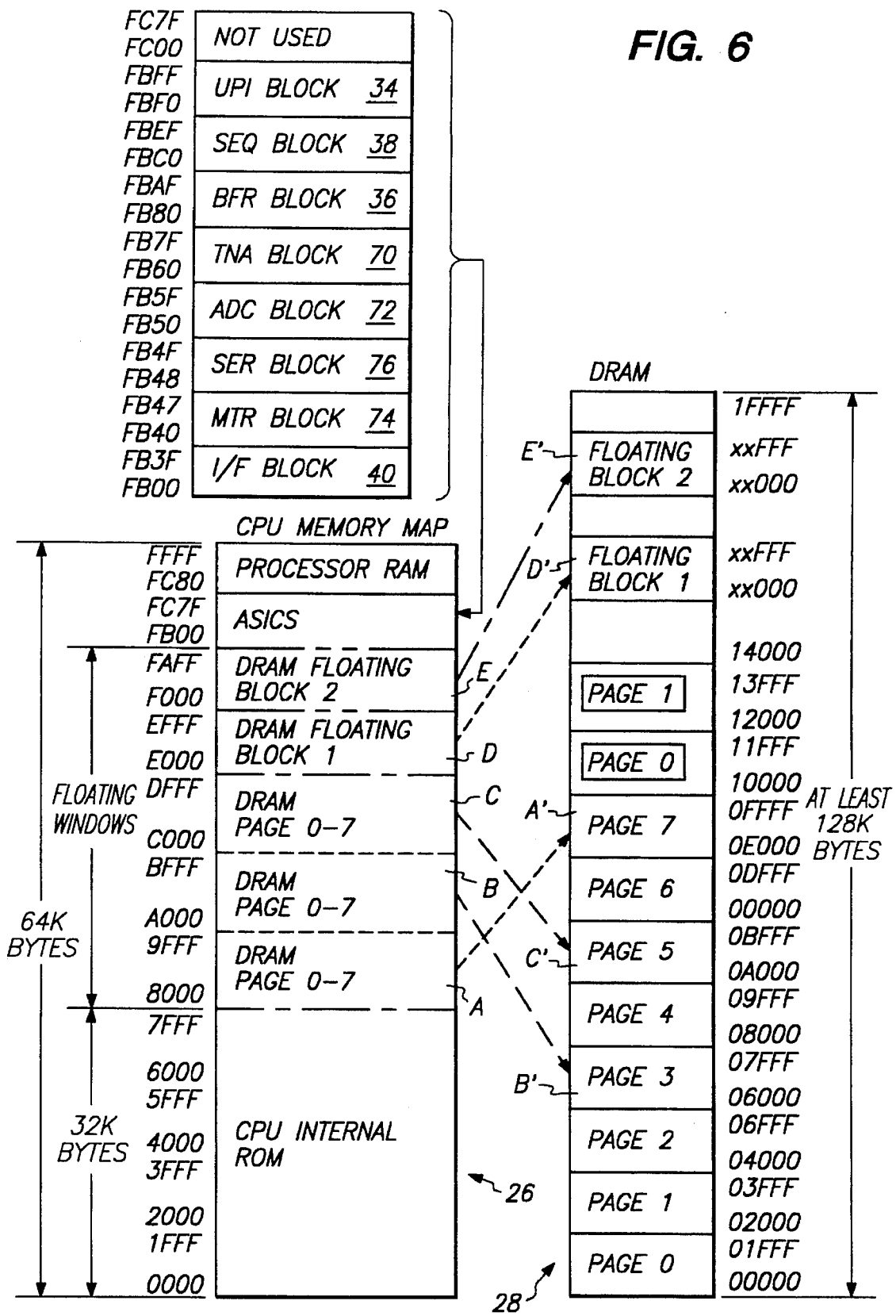
FIG. 6 is a detailed memory map diagram for the embedded microcontroller, microcontroller-addressable registers of the drive electronics IC, and the multitasked memory array of the FIG. 2 architecture.

FIG. 6 sets forth an exemplary memory space allocation map showing that the microcontroller 26 has e.g. 64 kilobytes of directly addressable memory space, and that the drive buffer memory 28 has e.g. 128 kilobytes, or more, of addressable memory space in which each separately addressable storage location comprises e.g. a 16 bit data word. Within the directly addressable memory space of the microcontroller 26, the lower 32 kilobytes are dedicated to addressing the local program read only memory 42, and the space e.g. from FB00(Hex) to FFFF(Hex) is dedicated to registers within the disk drive electronics chip as shown at the top of FIG. 6, and to directly addressable random access memory within the microcontroller 26. The micro controller's space between e.g. 8000(Hex) and FAFF(Hex) defines a plurality of floating data block windows A, B, C, D and E, each of which is mapped by the buffer map 48 into addresses of the buffer memory 28, as shown by the several dashed lines leading from the floating window space of the micro controller's address space to blocks of the larger buffer memory array 28.

Figure 7A:
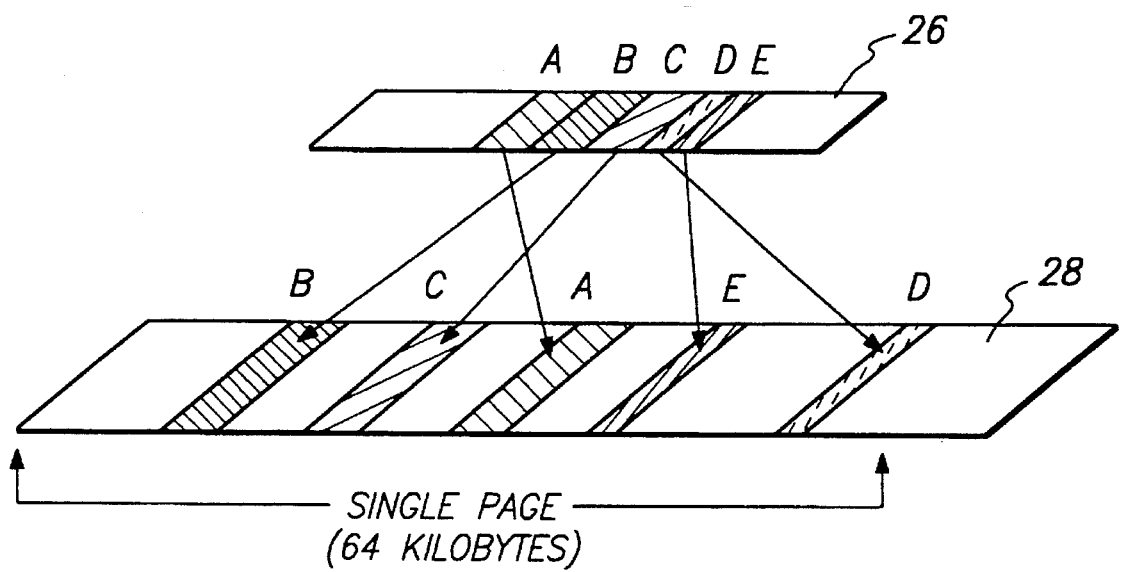
FIG. 7A is a diagram of one example of mapping five floating segments of the microcontroller memory space to separate block locations in the multitasked memory array in accordance with aspects of the present invention.
Figure 7B:
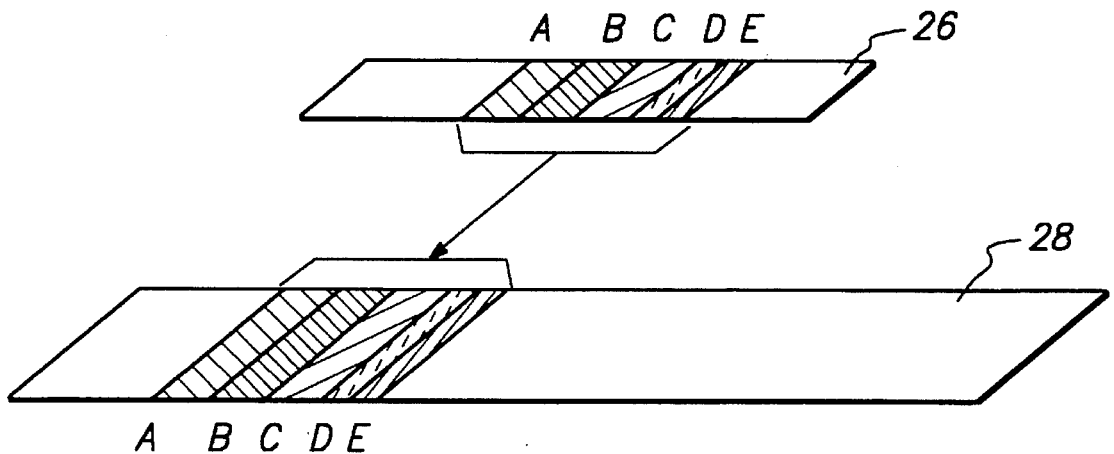
FIG. 7B is a diagram of another example of mapping the five floating segments of the microcontroller memory space to the multitasked memory array as one contiguous memory space in accordance with other aspects of the present invention.

As illustrated in FIG. 7A, the floating windows A, B, C, D and E of the microcontroller 26 may be mapped as plural discrete blocks to different address locations A', B', C', D' and E' of the buffer memory 28, keeping in mind that the block sizes of the discrete windows A–E are respectively the same size as the mapped locations A'–E'. FIG. 7B illustrates a special case in which the floating block windows A–E are concatenated into a single contiguous address space which is translated to the space A'–E' in the buffer memory 28.

Figure 8:
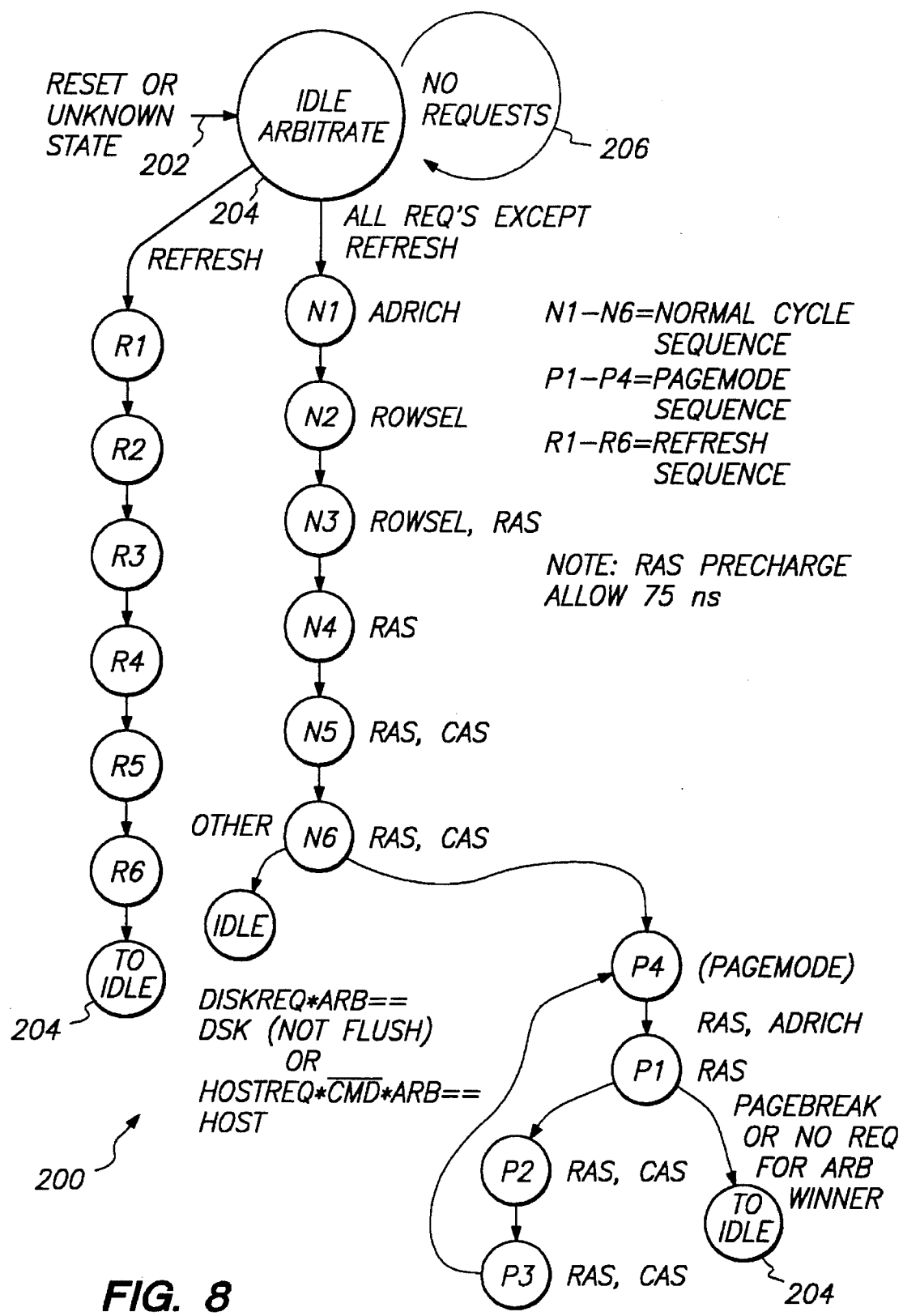
FIG. 8 is a state diagram of a memory controller state machine within the buffer memory access arbitration circuit shown in FIG. 4 buffer controller block.

Before discussing an example of arbitration within the arbitration circuit 52, as set forth below in conjunction with FIG. 9, a buffer control state machine 200 will first be discussed. This state machine is also resident within the arbitration control block 52 and its states are depicted in FIG. 8. The state machine 200 is reset by assertion of a reset command at a step 202 or otherwise enters an idle arbitrate state 204. So long as there are no access requests asserted either by the sequencer 38, by the microcontroller 26, by the host interface controller 40, or by a memory refresh requirement, the state machine 200 goes through a "no requests" loop 206.

When a request for buffer memory access is received, the idle state 204 is left and a first state N1 of a normal cycle sequence is entered. The first state N1 causes the full address value to be latched from the selected source (such as the microcontroller 26) into the address multiplexer 114. During a second state N2 of the normal sequence, a row half of the latched address is identified within the multiplexer 114. During a third state N3 the row address is sent via the path 64 into the DRAM buffer memory 28 along with assertion of a row address select (RAS) control line. RAS remains asserted throughout the balance of the normal cycle. State N4 continues with assertion of the RAS control line. During this state a column portion of the full address is now asserted from the multiplexer 114 over the path 64 to the buffer memory 28. In this manner, the path 64 need provide only one half of the required address lines for addressing the entirety of the memory space definable by the memory array 28. This column address is then applied to the memory upon assertion of a column address select (CAS) control value during a normal state N5. At the completion of a final state N6 of the normal cycle, both the RAS and CAS signals become deasserted, and the state machine 200 decides whether to return to the idle state 204, or whether to enter a page mode.

Page mode enables very rapid sequential data word transfers to and from the buffer 28. For example, the first word to be transferred into the sequencer FIFO 39 would be transferred by the normal mode sequence. The remaining five data words needed to fill (or empty) the FIFO 39 would then be transferred by the page mode, providing the address did not cross a data block (page) boundary (wherein a data block may comprise 512 data bytes or 256 data words, for example). There are four states in the page mode. The first state entered in page mode is a state P4. State P4 handles an address setup operation during which the address incrementer 126 is e.g., incremented by one address count. This new address is then stored in a register of the transfer control block 118 and put out through the address multiplexer 114 to the buffer memory 28.

During a subsequent state P1 of page mode, a decision is made whether or not to continue and, if so, to assert a new column address. During state P2, CAS is asserted. State P3 represents a program delay to enable values to stabilize within the memory array. During state P4, the sequencer FIFO 39 is being strobed to gather the data word being transferred. The FIFO pointer is being incremented, etc. This sequence is then repeated automatically for each of the data words to be transferred to (or from) the sequencer FIFO 39. The same page mode process also applies to data transfers between the buffer 28 and the host interface FIFO 41. The P1 state checks whether the involved FIFO is full or empty (which is a condition for arbitration of priority). If so, or if there is a page break, a return is made to the idle state 204. The page break is a function of the DRAM 28, and typically may be set at each 256 bytes. When a page break in DRAM 28 is encountered, it is necessary to return to the normal cycle to reset the addresses into the DRAM.

The refresh sequence is conventional and is specified by the manufacturer of the particular DRAM selected as the buffer array 28. One presently preferred refresh method is to assert CAS before RAS, and steps R1 through R6 essentially carry out this refresh methodology. Once refresh is completed, a return is made to the idle/arbitrate state 204. Whenever the DRAM 28 sees CAS asserted before RAS, it knows that a refresh cycle is being asserted. Counters within the DRAM 28 keep track of what area of the array was last refreshed, so that the refresh cycle is evenly distributed in time over the entire buffer array 28.

Figure 9:
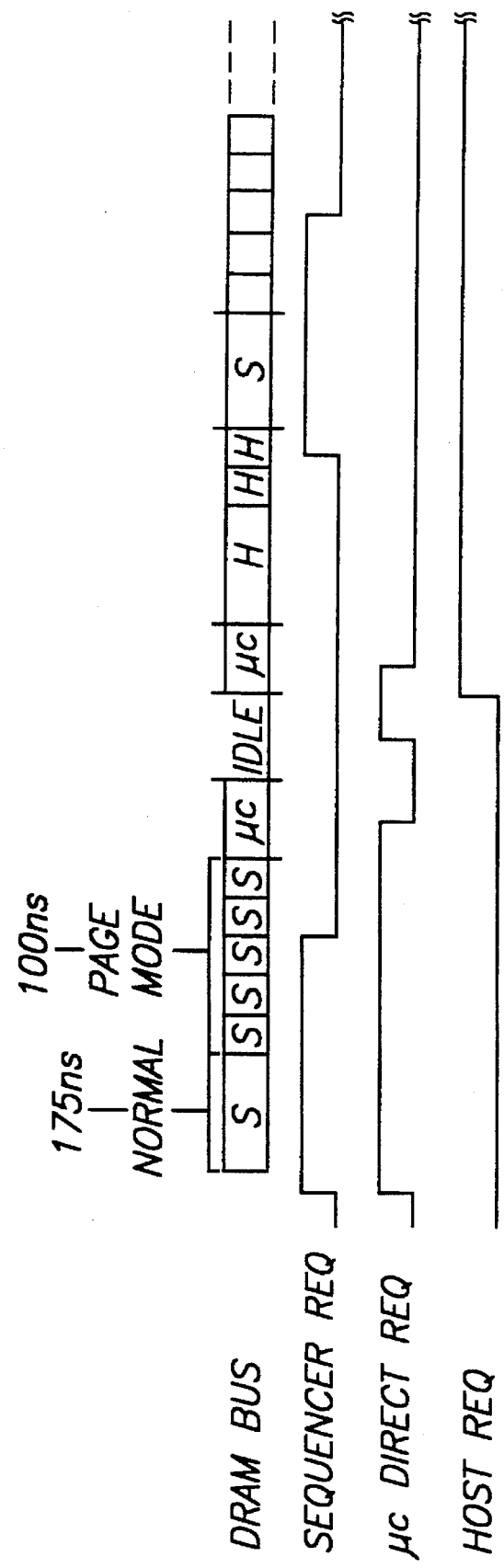
FIG. 9 is a timing diagram example illustrating memory access arbitration operations of the FIG. 4 buffer controller block in accordance with principles of the present invention.

FIG. 9 illustrates an example of arbitration. The DRAM data bus traffic is illustrated by the top graph. Two requests for access are applied to the arbitration circuit 52 at the same time. One request comes from the sequencer 38 over the control path labeled SEQUENCER_REQ in FIG. 9, and the other from the microcontroller 26 over the control path labeled UC DIRECT_REQ. Since the sequencer has highest priority in this example, the sequencer is given first access to the buffer, and the microcontroller 26 is placed into a wait state by virtue of assertion of the wait line 62. The normal cycle sequence, during which one word is transferred between the buffer 28 and the sequencer FIFO 39, nominally requires about 175 nanoseconds. Thereafter, five words are transferred during page mode, and the page mode sequence only requires about 100 nanoseconds per word transferred. Once the six words have been transferred between the sequencer FIFO 39 and the buffer 28, the microcontroller gains access the buffer, and the DIRECT_REQ line becomes deasserted. At this point, there are no requests for access presented to the arbitration circuit 52, and the buffer control state machine 200 idles in the idle/arbitrate state 204. The microcontroller then asserts an access request and is serviced. The host interface 40 then requests access, and a normal data transfer sequence is followed by two page mode sequences. In the meanwhile, the sequencer again requests access, and bumps the host access request. The sequencer then obtains direct access to the memory and completes its normal and page mode sequences.

Once a direct access is established between the microcontroller 26 and the DRAM buffer array 28, further techniques may be employed to increase the effective bandwidth. In this regard, it will be appreciated that disk drives are somewhat unique in that they manifest three or four dedicated process threads which are ongoing fairly continuously. One process thread is the transfer of data between the disk storage surface 12 and the buffer 28 via the sequencer 38 and sequencer FIFO 39. Another process thread is the transfer of data between the host computer 30 via the external bus structure 32, interface controller 40 and interface FIFO 41. A third process thread is transfer of instruction sequences from the buffer 28 to the microcontroller 26, and a fourth process thread is the transfer of data tables and values between the microcontroller 26 and the buffer 28.

Figure 10:
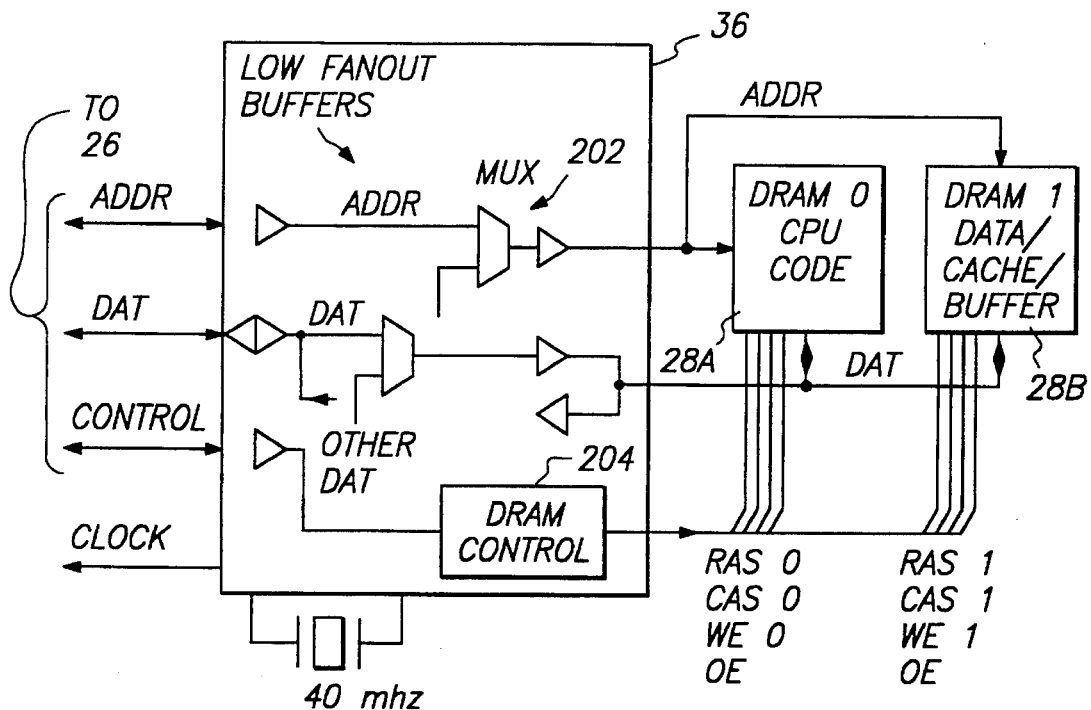
FIG. 10 is a simplified block diagram of a DRAM array employing two conventional DRAM chips in multiplexed arrangement wherein one DRAM is adapted for direct access by the microcontroller, and the other DRAM is adapted for direct access by the sequencer and host.

FIG. 10 shows a modification of the present invention to provide two standard DRAM buffer memory arrays (chips) 28A and 28B. The first DRAM buffer 28A is e.g. primarily devoted to storage and retrieval of program instruction sequences, tables and variables for use by the microcontroller 26. The second DRAM buffer 28B serves as a data/cache buffer for data block transfers between the sequencer 38 and the host interface 40.

Additional multiplexing circuitry 202 and chip select circuitry 204 are provided in the buffer controller 36. This architecture of FIG. 10 provides bandwidth improvements in that sustained page mode transfers of up to 256 words per transfer may be carried out at effectively double the bandwidth of an architecture employing only a single buffer 28. This approach is low cost in the sense that conventional DRAM chips may be employed for the memories 28A and 28B, and the additional chip select circuitry 204 enables separate signals to be generated and put out to each of the chips 28A and 28B.

Figure 11:
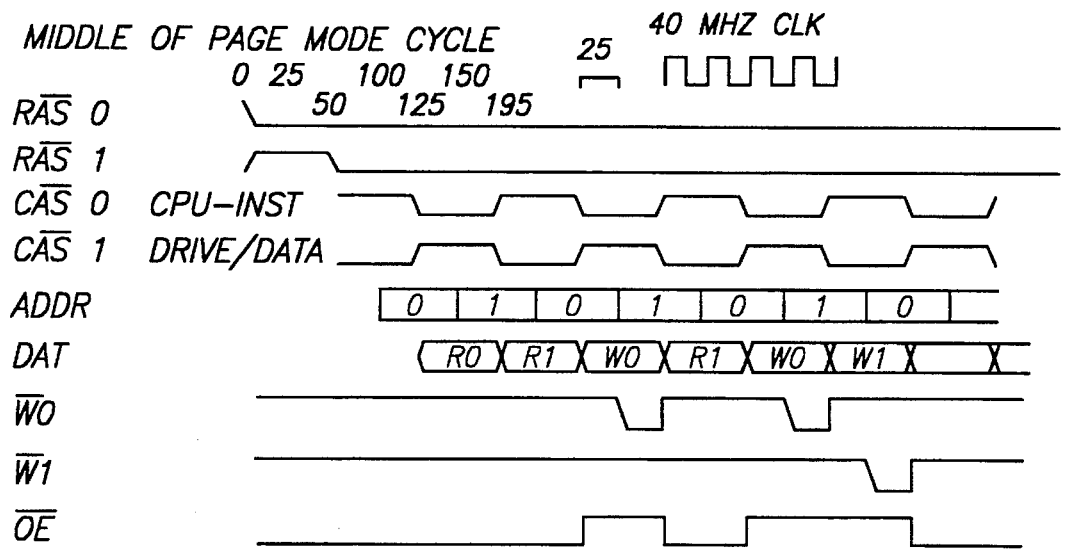
FIG. 11 is a timing diagram illustrating interleaved data transfer operations of the FIG. 10 memory array.

FIG. 11 illustrates the timing relationships by which interleaved memory access cycles are achieved within page mode with the FIG. 10 implementation. In this arrangement BAR CAS 0 is out of phase with BAR CAS 1. While BAR CAS 0 is true (low) a data word may be read from or written to the buffer 28A. While BAR CAS 1 is true (low) a data word may be read from or written to the buffer 28B. Writing can occur once the address for the particular array has stabilized on the multiplexed address bus. The data to be written is latched in synchronism with the appropriate falling edge of CAS.

Figure 12:
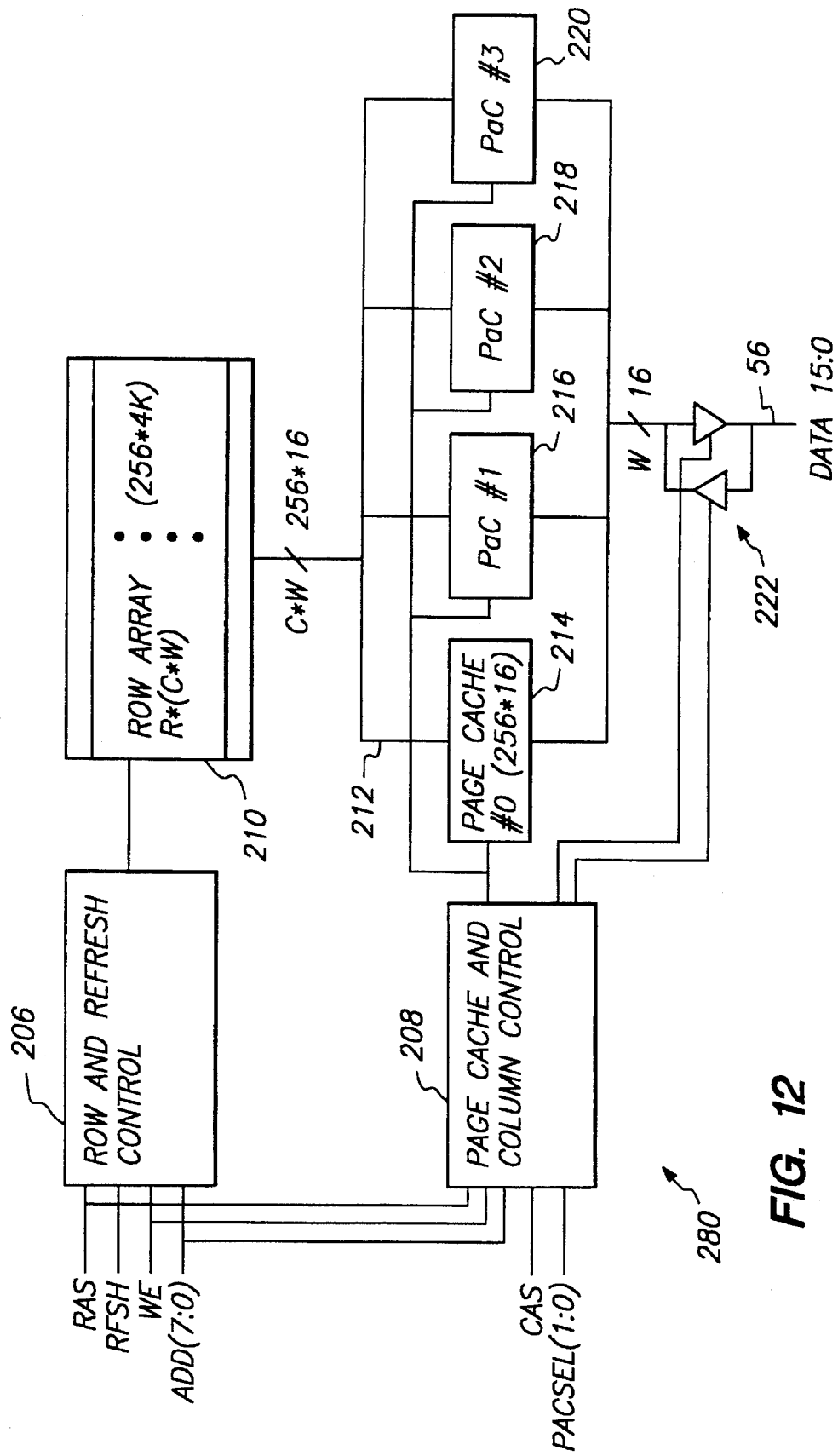
FIG. 12 is a simplified block diagram of a single chip DRAM array arranged as a main segment with four page caches, each devoted to a separate disk drive process thread.

FIG. 12 sets forth a single DRAM 28C following an architecture optimized for disk drives, such as the drive 10 of the present invention. In this chip 28C, a row and refresh control circuit 206 generates suitable RAS and refresh signals, while a page cache and column control circuit 208 generates suitable column and page cache control signals. The row and refresh control signals generated by the row and refresh control circuit 206 are applied to a main memory array 210 of the chip 28C, while the page cache and column control signals from the circuit 208 are applied to four page cache arrays 214, 216, 218, and 220. An internal data bus structure 212 provides a data path between the main array 210 and each cache array 214–220. Bi-directional driver circuitry 222 connect data outputs from the cache arrays 214–220 to the main memory bus 56.

In the main array 210 in the present example the row size is e.g. 256, and the column size is also 256, with a word length of 16 bits. Columns within each page cache 214–220 are accessed individually using CAS, PACSEL 1:0 and the low eight address lines ADD 7:0. Rows are accessed in their entirety (C*W bits being read or written) using RAS and ADD 7:0. Refresh may occur in parallel by providing an internal row counter during absence of a RAS cycle. The page caches 214–220 are preferably formed as latch arrays, and may preferably be static, rather than dynamic memory.

The first cache array 214 may be directed to the microcontroller program process thread, for example. The second cache array 216 may be directed to the microcontroller tables and variables process thread. The third cache array 218 may be directed to data transfers between the sequencer FIFO 39 and the buffer 28, and the fourth cache array 220 may be directed to data transfers between the host FIFO 41 and the buffer 28. These assignments are arbitrary and may change in real time under program control of the microcontroller 26. This arrangement takes advantage of the fact that each of these four process threads statistically tends to operate within a single page area (e.g. 256 16-bit words) for some given length of time, and often sequentially.

Each time one of these process threads involves an access to the main array 210, a standard RAS/CAS cycle would be carried out, with RAS being the page mode. Once every process has performed a RAS/CAS cycle, the second and subsequent times around, the particular process gets data from its particular page, and the RAS cycle is no longer needed. Consequently, the access cycle time is cut in half, for e.g. up to the next 255 data word accesses. This approach has proven very efficient for the disk and host block transfer processes, since they are sector oriented. It works fairly well for the microcontroller program code transfers also, depending upon how much the process jumps across page boundaries. Microcontroller code can be tailored to constrain most jumps to locations within a memory page, so that random accesses may be limited to the address space of the cache then holding the program instruction sequence, e.g. cache 214. In this approach, when switching from one cache to the next, the output from the first cache is placed on the bus 56 just long enough to be transferred to its destination, e.g. the sequencer FIFO 39. Then, the output from the next cache is multiplexed onto the bus 56. This multiplexing, together with elimination of the RAS cycles approaches an effective quadrupling of bandwidth of the data bus 56, and transfers at rates up to and above e.g. 40 megabytes per second are entirely practical with existing DRAM technology.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. In a disk drive architecture including a rotating data storage disk, a positionable data transducer for writing data to, and reading data from, selectable track locations defined on the disk, a preamplifier/driver connected to the data transducer, a read/write channel connected to the preamplifier/driver, sequencer means including sequencer FIFO buffer means for transferring user data blocks between selected track locations of the disk and the sequencer FIFO buffer means, host interface controller means including interface FIFO buffer means for transferring user data blocks, commands and status values between a host computer and the interface FIFO buffer means, buffer memory means for storing data blocks in transit between the sequencer means and the host interface controller means, buffer controller means for controlling accesses to the buffer memory means, programmed digital microcontroller means for decoding and executing commands received from the host computer and for controlling a positioning mechanism for positioning the data transducer at selected track locations, an improvement enabling program execution by the microcontroller means of microcontroller instructions stored in the buffer memory means comprising:

microcontroller interface means connected between the microcontroller means and the buffer controller means, the microcontroller interface means including address mapping register means for mapping at least one predetermined portion of directly addressable memory of the microcontroller means to address locations of the buffer memory means and further including instruction prefetch register means for storing microcontroller instructions retrieved from the buffer memory means, the buffer controller means including programmable access arbitration means for arbitrating requests for access to the buffer memory means by the sequencer means, the host interface controller means and the microcontroller means and, microcontroller wait state generator means responsive to the access arbitration means for generating and asserting a wait state control to the microcontroller means until a request made by the microcontroller means for access to the buffer memory means can be handled.

2. The improved disk drive architecture set forth in claim 1 wherein the buffer memory means comprises a single dynamic random access memory chip defining a storage array, and wherein the arbitration means further arbitrates requests for memory refresh operations generated by the buffer controller means.

3. The improved disk drive architecture set forth in claim 1 wherein the buffer memory means is arranged to store 2N-bit wide data at each addressable storage location wherein N is natural number and wherein the microcontroller means is arranged to retrieve 1N-bit wide data from the buffer memory means, and wherein a first retrieval of a 1N-bit wide datum by the microcontroller means from the buffer memory means causes the instruction prefetch register means to concurrently retrieve a second 1N-bit wide datum from the buffer memory means so that said second 1N-bit wide datum is transferred directly from the instruction prefetch register means to the microcontroller means if the microcontroller means attempts an immediately subsequent sequential read from the buffer memory means.

4. A method for sharing a single buffer memory in a disk drive between a sequencer, a host interface controller and an embedded digital microcontroller for controlling data storage and retrieval operations of the disk drive whereby the microcontroller may execute a set of microcontroller instructions stored in the buffer memory without impeding accesses to the buffer memory initiated by the sequencer and the host interface controller, the method comprising the steps of:

mapping at least one predetermined portion of directly addressable memory space of the microcontroller to address locations of the buffer memory, arbitrating requests for access to the buffer memory by the sequencer, the host interface controller and the microcontroller, loading the set of microcontroller instructions into the buffer memory, generating and applying a wait state sequence to the microcontroller until a request made by the microcontroller for access to the buffer memory can be executed as determined by the arbitrating step, and executing said request made by the microcontroller for access to the buffer memory by generating and applying a data location address mapped from an address supplied from the microcontroller to the buffer memory and transferring data values between the microcontroller and the buffer memory.

5. The method set forth in claim 4 wherein the mapping step comprises the step of mapping a plurality of predetermined portions of directly addressable memory space of the microcontroller to plural block address locations of the buffer memory.

6. The method set forth in claim 5 wherein the step of mapping a plurality of predetermined portions of directly addressable memory space of the microcontroller to plural block address locations of the buffer memory comprises the steps of separately mapping for each one of a plurality of discrete blocks as independently floating data block windows via a buffer mapping means into address locations of the buffer memory.

7. The method set forth in claim 6 comprising the further steps of accessing and executing with the embedded digital microcontroller a control program routine in the buffer memory at locations within one of said independently floating data block windows, and transferring data values to and from the buffer memory during execution of said control program routine at storage locations within another of said independently floating data block windows.

8. The method set forth in claim 4 wherein the buffer memory defines addressable storage locations which are sized to be integral multiples of the bit width of the data transferred between the microcontroller and the buffer memory and wherein the step of executing the request for access to the buffer memory by the microcontroller comprises for a first access to a particular address location of the buffer memory the further step of caching a portion of a memory value at the particular address location which is not transferred between the microcontroller and the buffer memory in a microcontroller cache buffer.

9. The method set forth in claim 8 wherein the step of executing the request for access to the buffer memory by the microcontroller comprises for a second and successive access to the particular address location of the buffer memory the further step of retrieving the portion from the microcontroller cache buffer.

10. The method set forth in claim 4 wherein the arbitrating step comprises a further step of assigning access priorities to the sequencer, the host interface controller and the microcontroller.

11. A disk drive comprising:

a base, a data storage disk rotating relative to the base, a data transducer positioned relative to the disk for transducing serial data to and from the disk, a programmed microcontroller for controlling data transfers between the disk drive and a host computing system, for controlling positioning of the transducer, and for controlling rotation of the data storage disk, a buffer memory array for temporary storage of data blocks in transit between the disk drive and the host computing system and for concurrent storage of executable microcontroller instructions, a host interface for transferring data blocks between the host computing system and the buffer memory array, a sequencer for transferring data blocks between the buffer memory array and the data storage disk by converting blocks to and from serial data and for detecting predetermined data storage locations on the data storage disk, a microcontroller interface circuit including a memory translation circuit for translating external direct addresses put out by the microcontroller into addresses for directly addressing the buffer memory array, and a buffer memory controller circuit including an arbitration circuit for arbitrating access requests by the microcontroller, the sequencer and the host interface, and a microcontroller cache buffer for temporarily storing at least one value sought by the microcontroller from the buffer memory array while another value sought by the microcontroller is transferred directly from the buffer memory array to the microcontroller.

12. The disk drive set forth in claim 11 wherein the microcontroller includes internal read only memory within a predetermined segment of microcontroller direct address space, and wherein the memory translation circuit translates addresses within the microcontroller's address space which are located outside of the predetermined segment.

13. The disk drive set forth in claim 12 wherein the memory translation circuit translates addresses within the microcontroller's address space into one of a plurality of programmable windows of address space of the buffer memory array.

14. The disk drive set forth in claim 11 wherein the buffer memory array comprises a main DRAM memory array, and a plurality of page cache arrays, and multiplex means for multiplexing data from each said page cache array onto a bus leading from the cache buffer.

15. The disk drive set forth in claim 14 wherein the plurality of page cache arrays comprises four cache arrays.

16. The disk drive set forth in claim 11 wherein the sequencer and the host interface each includes a first-in, first-out buffer for temporarily holding a plurality of values, and wherein the buffer memory controller circuit includes a state machine operating in a page mode for automatically transferring pluralities of values between the buffer memory array and a selected one of the first-in, first-out buffers.

17. The disk drive set forth in claim 11 wherein the microcontroller cache buffer holds a plurality of values, and wherein the buffer memory controller circuit includes circuitry for determining whether a value sought by the microcontroller is located within the microcontroller cache buffer and if so, for transferring the value directly to the microcontroller without fetching from the buffer memory array.

18. The disk drive set forth in claim 11 wherein the buffer memory array comprises two DRAM chips and wherein the buffer memory controller circuit includes means for separately selecting, addressing and refreshing each said chip.

* * * * *